US011466504B2

(12) United States Patent
Reiter et al.

(10) Patent No.: US 11,466,504 B2
(45) Date of Patent: Oct. 11, 2022

(54) CLOSURE ASSEMBLY WITH ARTICULATING HINGE COVER

(71) Applicant: GM GLOBAL TECHNOLOGY OPERATIONS LLC, Detroit, MI (US)

(72) Inventors: Paige L. Reiter, Utica, MI (US); Thomas M. Lobkovich, Sterling Heights, MI (US); Timothy H. Waite, North Branch, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 553 days.

(21) Appl. No.: 16/429,844

(22) Filed: Jun. 3, 2019

(65) Prior Publication Data

US 2020/0378171 A1 Dec. 3, 2020

(51) Int. Cl.
*E05F 15/63* (2015.01)
*E05D 3/14* (2006.01)
*E05D 11/00* (2006.01)
*B60J 5/04* (2006.01)
*E05D 15/32* (2006.01)

(52) U.S. Cl.
CPC ............ *E05F 15/63* (2015.01); *B60J 5/0469* (2013.01); *B60J 5/0477* (2013.01); *E05D 3/147* (2013.01); *E05D 11/0054* (2013.01); *E05D 15/32* (2013.01); *E05Y 2900/531* (2013.01)

(58) Field of Classification Search
CPC . E05D 11/0054; E05D 15/1007; E05D 15/32; E05F 15/63
USPC .................................................. 16/250, 251
See application file for complete search history.

(56) References Cited

U.S. PATENT DOCUMENTS

| 2,157,027 | A | * | 5/1939 | Soss | E05D 3/16 16/250 |
| 5,220,708 | A | * | 6/1993 | Lucas | E06B 7/367 16/225 |
| 5,244,247 | A | * | 9/1993 | Kuwabara | B60J 5/047 16/365 |
| 6,141,909 | A | * | 11/2000 | Hanson | E06B 7/367 16/250 |
| 6,317,925 | B1 | * | 11/2001 | Pietryga | E05D 3/127 16/250 |
| 6,382,705 | B1 | * | 5/2002 | Lang | B60J 5/0479 296/146.12 |
| 8,453,298 | B2 | * | 6/2013 | Nichols | E05D 3/127 16/366 |

(Continued)

*Primary Examiner* — Gregory J Strimbu
(74) *Attorney, Agent, or Firm* — Quinn IP Law

(57) ABSTRACT

A closure system includes a closure panel assembly and a hinge assembly configured to connect the closure panel assembly to a body. The hinge assembly includes a first hinge and a second hinge configured to be pivotably secured to the body and to the closure panel assembly in parallel, the hinge assembly establishing a four-bar linkage. The closure system includes a hinge cover configured to be fixed to the first hinge and pivotably connected to the closure panel assembly. The closure panel assembly is movable between a closed position and an open position via pivoting of the first hinge and the second hinge. The closure panel assembly at least partially covering an opening in the closed position and at least partially uncovering the opening in the open position. The hinge cover articulated alongside the first hinge and at least partially covers the first hinge in the closed position.

7 Claims, 9 Drawing Sheets

(56) References Cited

U.S. PATENT DOCUMENTS

| | | | | |
|---|---|---|---|---|
| 2006/0267375 A1* | 11/2006 | Enomoto | ............. | E05F 15/646 |
| | | | | 296/155 |
| 2014/0265430 A1* | 9/2014 | Choi | ........................ | B60J 5/047 |
| | | | | 296/146.7 |
| 2017/0211308 A1* | 7/2017 | Kitamura | ............. | E05F 15/616 |
| 2017/0335611 A1* | 11/2017 | Brunnmayr | ............... | E05D 7/00 |
| 2020/0032569 A1* | 1/2020 | Taylor | ................. | E05D 11/1071 |

* cited by examiner

CLOSURE ASSEMBLY WITH ARTICULATING HINGE COVER

INTRODUCTION

Power closure panels such as doors are typically controlled to move between open and closed positions to permit entry and exit through an opening of a compartment or room which they partially enclose. Hinges may connect the closure panels to the structure. The geometry of the hinges may affect the path over which the closure panels move when the hinges are pivoted. For example, a hinge assembly that establishes a four-bar linkage may allow a closure panel to move from a closed position to an open position by moving along an arced path that moves the closure panel outward and laterally relative to the opening but maintains the closure panel parallel with the opening throughout this range of motion. Tram-style doors are one example of closure panels that may be configured to move in this manner.

In some applications, the hinge assembly may be disposed below the opening covered by the closure panel, such as under a floor of a vehicle or structure so that it is hidden from view when the closure panels are in a closed position. This may improve aesthetics as well as protect against inadvertent contact with the hinge assembly.

SUMMARY

In some applications, packaging space limitations may necessitate that a hinge assembly for a closure panel assembly is disposed where it is readily viewable and accessible throughout its range of motion, such as by a person entering or exiting a vehicle access opening. For example, some vehicles may utilize available space below the floor for packaging of battery cells or other components so that the one or more hinge assemblies that direct movement of the closure panel assembly are positioned at a level within the bounds of the opening (e.g., above a lower extent or below an upper extent of the opening). A hinge concealment mechanism provided herein solves the issues associated with a hinge assembly disposed within the bounds of the opening without limiting the movement path of the closure panel assembly between the closed and open positions that is dictated by the movement of the hinge assemblies.

More specifically, a closure system at least partially closes an opening defined by a body. The closure system comprises a closure panel assembly and a hinge assembly configured to connect the closure panel assembly to the body. The hinge assembly includes a first hinge configured to be pivotally secured to the body and to the closure panel assembly, and a second hinge configured to be pivotally secured to the body and to the closure panel assembly in parallel with the first hinge. The hinge assembly establishes a four-bar linkage. The closure system also includes a hinge cover configured to be fixed to the first hinge and pivotably connected to the closure panel assembly. The closure panel assembly is movable between a closed position and an open position via pivoting of the first hinge and the second hinge. The closure panel assembly at least partially covers the opening in the closed position and at least partially uncovers the opening in the open position. The hinge cover is configured to articulate alongside the first hinge throughout a range of motion of the closure panel assembly from the closed position to the open position and at least partially covers the first hinge in the closed position.

In another aspect, a hinge concealment mechanism is provided for a hinged closure system. The hinged closure system includes a closure panel assembly hinged to a body by a four-bar linkage hinge assembly that includes a first hinge and a second hinge spaced in parallel with one another. The hinge concealment mechanism comprises a segmented hinge cover configured to be fixed to the first hinge of the four-bar linkage hinge assembly and pivotably connected to the closure panel assembly establishing a first hinge cover pivot axis spaced apart from the first hinge. When the closure panel is in a closed position, the first hinge is configured to be disposed inward of the second hinge toward the body and the segmented hinge cover is configured to be disposed inward of the first hinge toward the body. The segmented hinge cover is configured to articulate alongside the first hinge over a range of motion of the four-bar linkage assembly when the four-bar linkage assembly pivots to move the closure panel assembly from a closed position to an open position, and the segmented hinge cover is configured to be relatively extended when the closure panel assembly is in the closed position, and relatively folded when the closure panel assembly is in the open position.

In still another aspect, a vehicle comprises a body having a floor and defining an opening above the floor for entrance and egress from the body. The vehicle includes a closure system with a closure panel assembly and a hinge assembly disposed above the floor and connecting the closure panel assembly to the body. The hinge assembly includes a first hinge pivotably secured to the body and to the closure panel assembly, and a second hinge pivotably secured to the body and to the closure panel assembly in parallel with the first hinge, the hinge assembly establishing a four-bar linkage. The vehicle also includes a hinge cover fixed to the first hinge and pivotably connected to the closure panel assembly. The closure panel assembly is configured to move between a closed position and an open position via pivoting of the first hinge and the second hinge, the closure panel assembly at least partially covering the opening in the closed position and at least partially uncovering the opening in the open position. The hinge cover is configured to articulate alongside the first hinge throughout a range of motion of the closure panel assembly from the closed position to the open position and at least partially covers the first hinge in the closed position.

The above features and advantages and other features and advantages of the present disclosure are readily apparent from the following detailed description of the best modes for carrying out the disclosure when taken in connection with the accompanying drawings.

DETAILED DESCRIPTION

Figure 1:
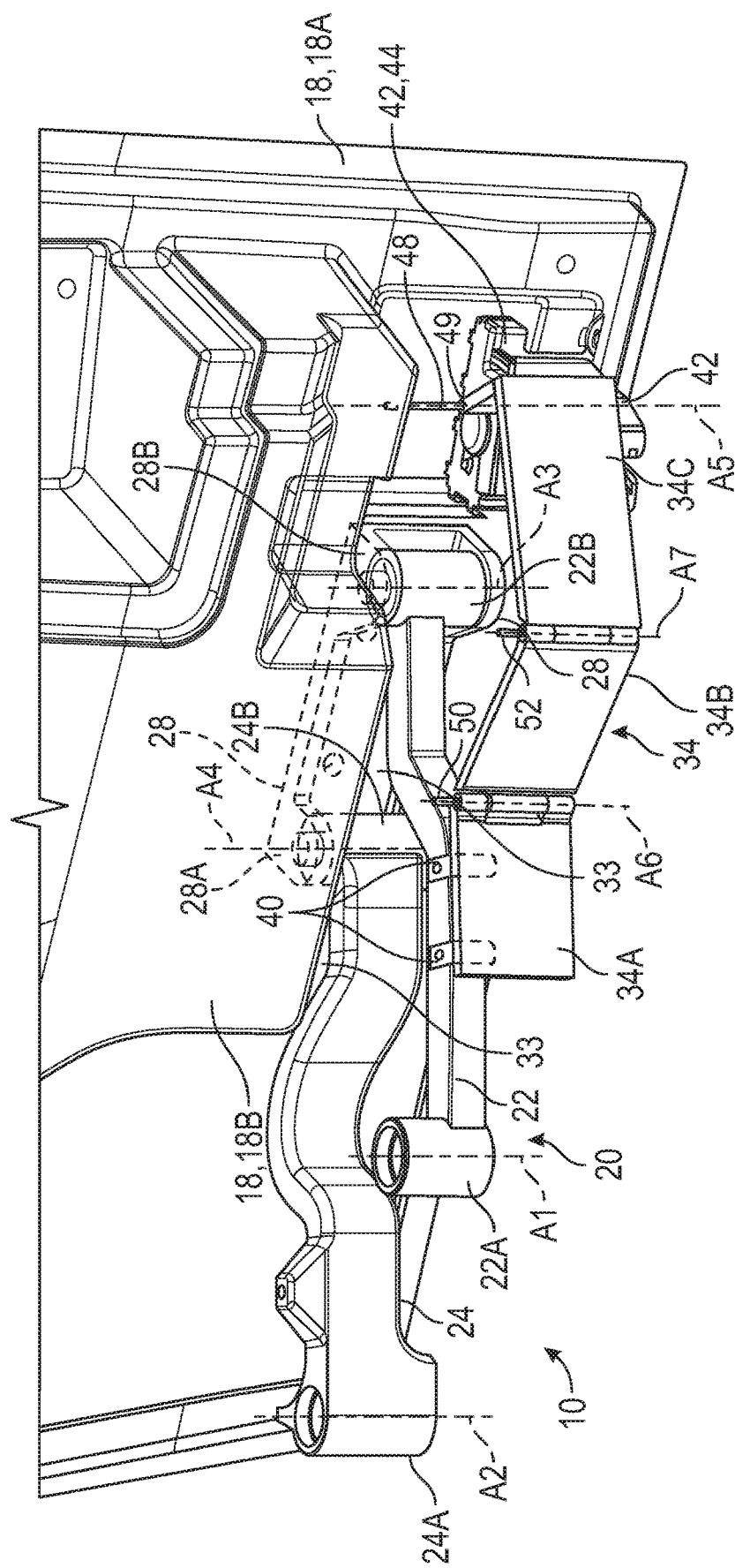
FIG. 1 is a fragmentary perspective view of a portion of a closure system with a closure panel assembly, lower hinge assembly, and hinge concealment mechanism with an inner panel included in the closure panel assembly.
Figure 2:
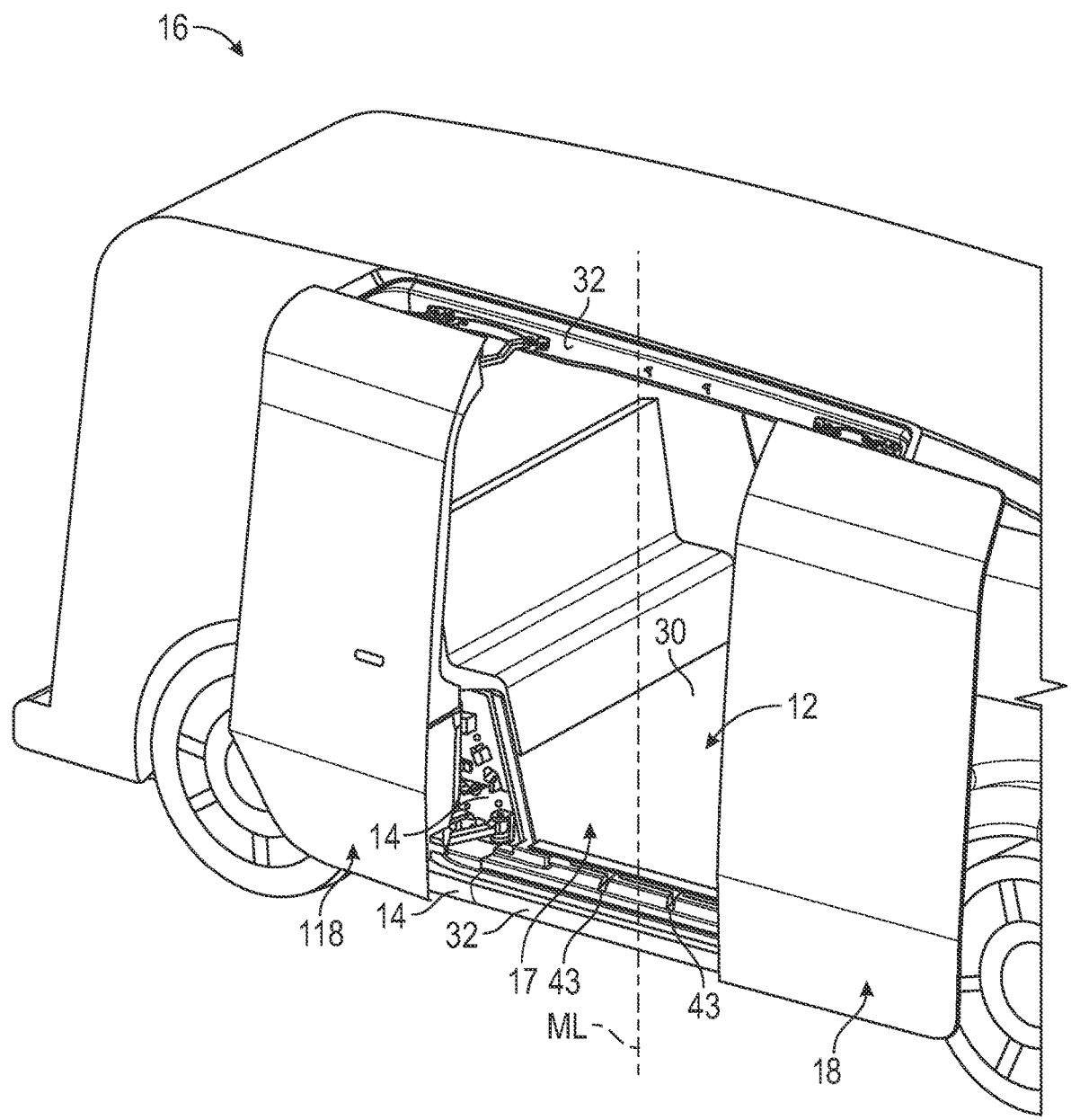
FIG. 2 is a fragmentary perspective view of a vehicle with a pair of closure panel assemblies in an open position.
Figure 4:
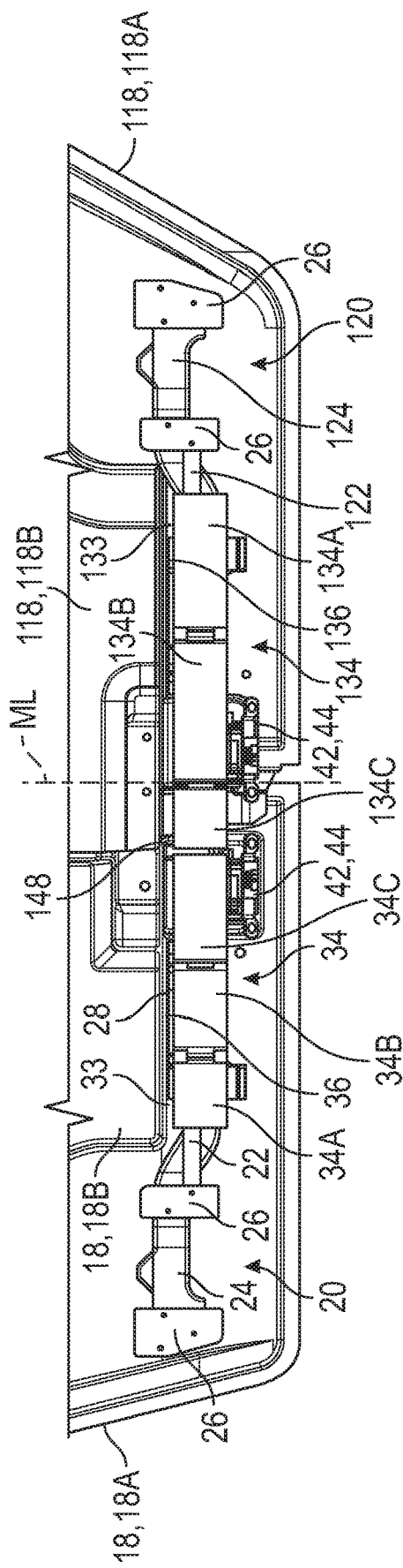
FIG. 4 is a fragmentary view of an inner side of the closure panel assemblies and lower hinge assemblies of FIG. 3 with hinge concealment mechanisms partially covering the hinge assemblies and with the closure panel assemblies in a fully closed position.

Referring to the drawings, wherein like reference numbers refer to like components, FIG. 1 is a fragmentary perspective view of a portion of a hinged closure system 10 for at least partially closing an opening defined by a body. For example, the portion of the closure system 10 shown in FIG. 1 shows one door assembly of a tram-style, two-door closure system 10 for closing (e.g., covering) the opening 12 of the body 14 of a vehicle 16 as shown in FIG. 2. The closure system 10 includes a closure panel assembly 18. As shown in FIG. 2, the closure panel assembly 18 is a front side door of the tram-style, two door closure system 10. The closure system 10 further includes a closure panel assembly 118 that is configured as a rear side door. When the closure panel assemblies 18, 118 are both in a closed position, the opening 12 is completely covered and entrance into or egress from the passenger compartment 17 of the vehicle 16 through the opening 12 is blocked by the closure panel assemblies 18, 118. The closure panel assembly 18 includes both a structural door panel 18A (e.g., an outer door panel) and an inner panel 18B that may be an inner trim panel or other door component inboard of the outer door panel 18A. The inner panel 18B is secured to the door panel 18A inboard of the door panel 18A (e.g., toward an interior of the vehicle 16 rather than toward the exterior). Similarly, as shown in FIG. 4, the closure panel assembly 118 includes a structural door panel 118A (e.g., an outer door panel) and an inner panel 118B that may be an inner trim panel or other door component inboard of and secured to the door panel 118A.

Figure 3:
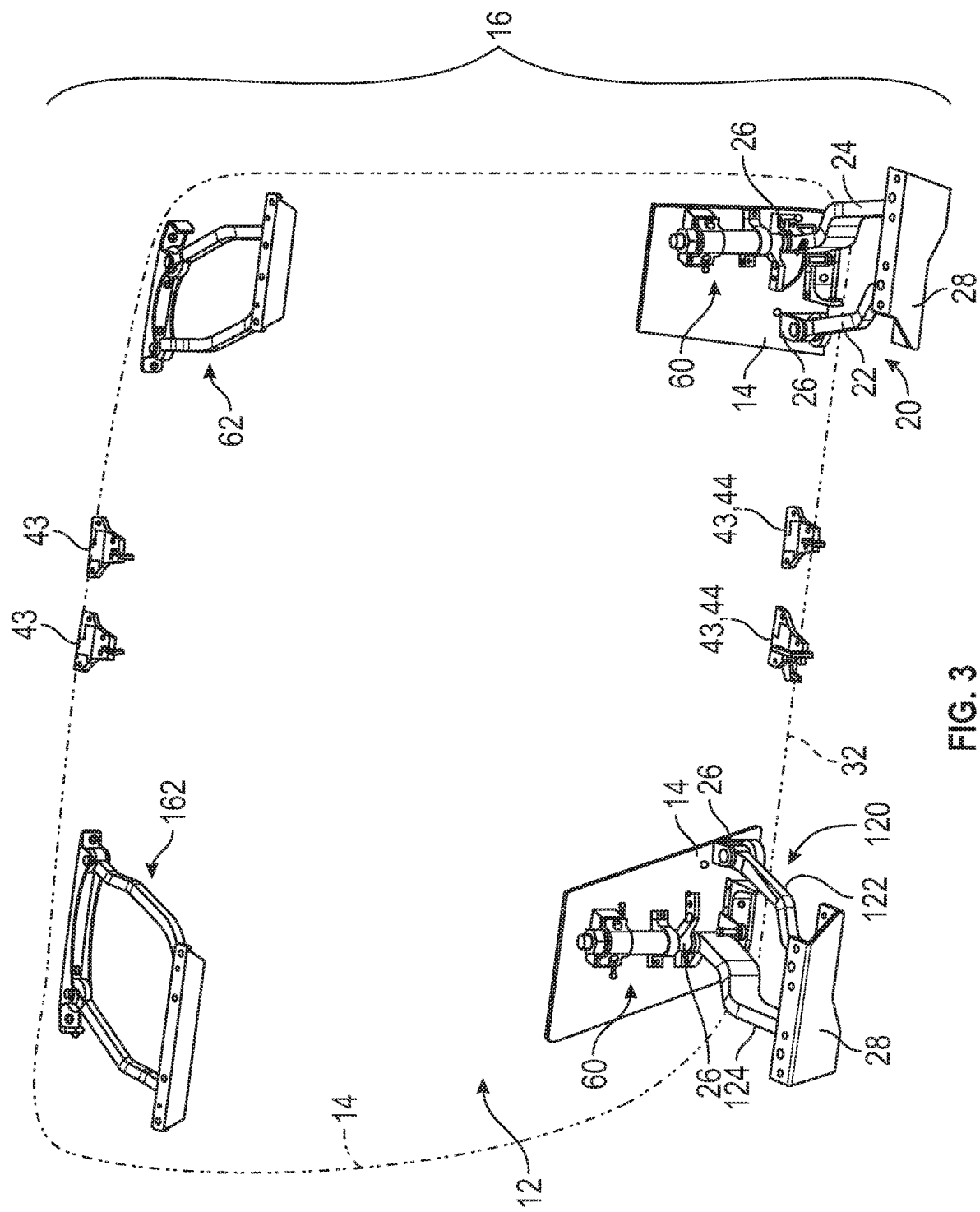
FIG. 3 is a perspective view of hinge assemblies, latches, and drive motors configured for moving the closure panel assemblies of FIG. 2.

The closure system 10 further includes a hinge assembly 20 configured to connect the closure panel assembly 18 to the body 14. The hinge assembly 20 includes a first hinge 22 configured to be pivotably secured to the body 14 and to the closure panel assembly 18, and a second hinge 24 configured to be pivotably secured to the body 14 and to the closure panel assembly 18 in parallel with the first hinge 22. The hinges 22, 24 are in parallel with one another as the pivot axes of the hinges at the door side are spaced apart by the same spacing as the pivot axes of the hinges at the body side. As best shown in FIG. 3, at least a portion of the body 14 is disposed inward of (e.g., inboard of) the first hinge 22 and the second hinge 24. Brackets 26 secure the hinges 22, 24 via respective knuckles 22A, 24A (labelled in FIG. 1) at their proximal ends (e.g., inboard ends or body-side ends) for pivoting motion relative to the body 14. The brackets 26 and body 14 are not shown in FIG. 1 in order to expose the entire hinges 22, 24. An inner side or inboard side of the brackets 26 is shown in FIG. 4. The first hinge 22 is thus configured to be pivotably connected to the body 14 at a first body-side pivot axis A1 that extends through the knuckle 22A. The second hinge 24 is configured to be pivotably connected to the body 14 at a second body-side pivot axis A2 that extends through the knuckle 24A. Pins (not shown in FIG. 1) extend through openings in the brackets 26 aligned with the knuckles 22A, 24A to secure the hinges 22, 24 to the body 14 at the brackets 26.

Distal ends (e.g., outboard ends or closure panel-side ends) of the hinges 22, 24 include knuckles 22B, 24B, respectively, at which the hinges 22, 24 are secured to the closure panel assembly 18 via one or more brackets 28 for pivoting motion relative to the closure panel assembly 18. As shown in FIG. 1, a single bracket 28 with spaced joints 28A, 28B is used to connect both distal ends of the hinges 22, 24 with the distal ends spaced apart from one another. Alternatively, separate spaced brackets could be used. The first hinge 22 is thus pivotably connected to the closure panel assembly 18 at a first closure panel-side axis A3 extending through the knuckle 22B into the joint 28B of the bracket 28. The second hinge 24 is pivotably connected to the closure panel assembly 18 at a second closure panel-side axis A4 extending through the knuckle 24B into the joint 28A of the bracket 28. Pins (not shown) extend through openings in the knuckles 22B, 24B aligned with openings in the bracket 28 to secure the hinges 22, 24 to the closure panel assembly 18 at the bracket 28.

With this configuration, the hinges 22, 24 together with the body 14 and the closure panel assembly 18 to which they are secured establish a four-bar linkage. The hinge assembly 20 may be referred to as a four-bar linkage hinge assembly. As best illustrated in FIGS. 9-13, the four-bar linkage causes the closure panel assembly 18 to move outward and away from the body 14 and then back toward the body 14 as the hinge assembly 20 pivots the closure panel assembly 18 over the entire range of motion of the closure panel assembly 18 (e.g., from a fully closed position shown in FIG. 9 (also referred to as a closed position) to a fully open position shown in FIG. 13 (also referred to as an open position). The closure panel assembly 18 maintains a generally parallel relationship with the opening 12 over the range of motion of the hinge assembly 20. The hinges 22, 24 pivot about the axes A1, A2, A3, and A4 without tilting up or down.

As best shown in FIGS. 2 and 3, the body 14 forms a door ring 32 that bounds the opening 12. The hinge assembly 20 is mounted to the body 14 above the vehicle floor 30 and above the lower extent of the door ring 32 so that it is within the bounds of the opening 12 and is disposed inward of the closure panel assembly 18. As shown in FIG. 1, due to the position of the hinge assembly 20 above the floor 30, the inner panel 18B is foreshortened in comparison to inner door trim panels that may extend to the floor 30. Instead, the inner panel 18B forms a recess 33 in which the hinge assembly 20 partially nests when in the closed position. For example, the bracket 28 is disposed in the recess 33 and a portion of the first hinge 22 is in the recess 33 in the closed position of FIG. 4.

Referring to FIG. 2, although shown as a closure system 10 for a vehicle 16, the closure system 10 described herein may be used for both vehicle and non-vehicle applications. For example, non-vehicle applications may include closure systems on other structures that define openings, such as on a door or window of a building. Accordingly, as used herein, a body may be a vehicle body and/or frame or a wall or other frame of a building or other structure. Additionally, although the vehicle 16 is depicted as a passenger vehicle, the closure system 10 may be employed in a variety of different types of vehicle applications. As used herein, vehicles include lawn equipment, farming equipment, boats, construction equipment, airplanes, trains, automotive vehicles, etc. For example, the vehicle 16 may be an autonomous vehicle and may have a battery pack disposed below the floor 30 of the passenger compartment 17.

A segmented hinge cover 34 is provided to at least partially conceal the first hinge 22 for improved aesthetics and for shielding the hinge assembly 20 from view and acting as a barrier to limit and prevent access to the hinge assembly 20. The hinge cover 34 is configured to be fixed to the first hinge 22 and pivotably connected to the closure panel assembly 18 as shown in FIG. 1. Without the hinge cover 34, at least the first hinge 22 would be exposed throughout the range of motion of the hinge assembly 20, including being exposed to an interior of the vehicle 16 when the closure panel assembly 18 is in the fully closed position. The hinge cover 34 is configured to articulate in order to move with the hinge assembly 20 over its entire range of motion without impeding the motion of the hinge assembly 20. As is apparent in FIGS. 9-13, the segmented hinge cover 34 is configured to be relatively extended when the closure panel assembly 18 is in the closed position, and to be relatively folded when the closure panel assembly 18 is in the open position. Additionally, as best shown in FIG. 4, the hinge cover 34 is configured to be disposed along a lower edge 36 of the inner panel 18B at the recess 33, with the first hinge 22 and the second hinge 24 disposed between (e.g., inward of) the hinge cover 34 and the inner panel 18B.

As shown in FIG. 1, the hinge cover 34 has a proximal segment 34A (also referred to herein as a first segment or section), an intermediate segment 34B (also referred to herein as a second segment or section), and a distal segment 34C (also referred to herein as a third segment or section). As best shown in the plan view of FIG. 9, the distal segment 34C is L-shaped. The proximal segment 34A is configured to be fixed to the first hinge 22 at an intermediate position along the length of the first hinge 22 between the first body-side pivot axis A1 and the first closure panel-side axis A3. One or more fixed (nonpivoting) brackets 40 may be welded or otherwise secured to the back (hinge-facing side) of the hinge cover 34 and bolted or otherwise secured to the first hinge 22. The brackets 40 are shown in hidden lines where they extend on and are welded to the back of the hinge cover 34.

A first portion 42 of a latch assembly 44 and is mounted to the closure panel assembly 18. The latch assembly 44 also includes a second latch portion 43 mounted on the body 14 at a lower extent of the opening 12 as shown in FIG. 3. For example, one of the portions 42, 43 may include a striker, and the other portion may include a latch. The latch assembly 44 is operable to latch the closure panel assembly 18 to the body 14 in the closed position.

Figure 9:
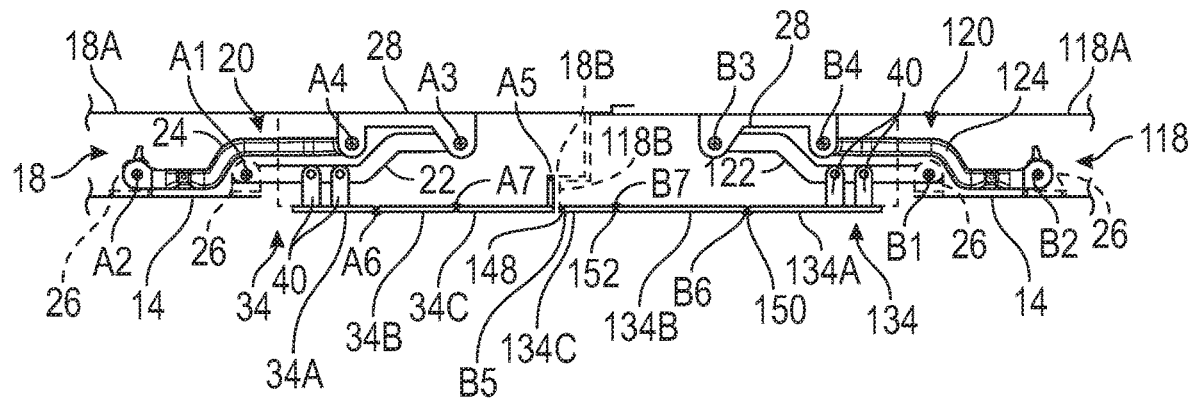
FIG. 9 is a top view of the closure panel assemblies, lower hinge assemblies, and hinge concealment mechanisms in the closed position of FIG. 4.

A pivot pin 48 extends through a knuckle 49 at the end of the distal segment 34C and into the inner panel 18B to pivotably secure the distal segment 34C to the closure panel assembly 18 at the first hinge cover pivot axis A5. In FIG. 9, the distal segment 34C is shown pivotably connected to the inner panel 18B at the first hinge cover pivot axis A5. Interfitting knuckles of the intermediate segment 34B and the proximal segment 34A receive a pivot pin 50 to pivotably secured the intermediate segment 34B to the proximal segment 34A at a second hinge cover pivot axis A6. Similarly, interfitting knuckles of the intermediate segment 34B and the distal segment 34C receive a pivot pin 52 to pivotably secure the intermediate segment 34B to the distal segment 34C at a third hinge cover pivot axis A7. The pivot pin 52 does not extend into the closure panel assembly 18 so that it is connected with segments 34B and 34C but not to the closure panel assembly 18.

The hinge cover 34 has one degree of freedom relative to the first hinge 22 at the second hinge cover pivot axis A6 as the intermediate segment 34B pivots relative to the first hinge 22 at the axis A6, but the proximal segment 34A is fixed to the first hinge 22 so that the axis A6 cannot translate relative to the first hinge 22. The hinge cover 34 has two degrees of freedom relative to both the first hinge 22 and the closure panel assembly 18 at the third hinge cover pivot axis A7. As further discussed with respect to FIGS. 9-13, the hinge cover 34 can both translate and pivot at the third hinge cover pivot axis A7 relative to the first hinge 22 and relative to the closure panel assembly 18. This arrangement of the hinge cover 34 enables the hinge cover 34 to articulate as the hinge assembly 20 moves through its full range of motion (e.g., the hinge cover 34 does not inhibit or affect movement of the hinge assembly 20).

With reference to FIGS. 1 and 2, the first body-side pivot axis A1 is disposed between a midline ML of the opening 12 (best shown in FIG. 2) and the second body-side pivot axis A2. The midline ML is defined as positioned between the two latch portions 43 of the latch assemblies 44 of the front and rear closure panel assemblies 18, 118. The first closure panel-side pivot axis A3 is disposed between the midline ML of the opening 12 and the second closure panel-side pivot axis A4. The first hinge cover pivot axis A5 is disposed between the midline ML of the opening 12 and the first closure panel-side pivot axis A3.

FIG. 3 shows portions of the vehicle 16 relating to movement and/or latching of the closure panel assemblies 18, 118 which are not shown in FIG. 3. A hinge assembly 120, also referred to herein as a second hinge assembly, is disposed at the same level as the hinge assembly 20 (e.g., above the floor 30 within the bounds of the opening 12) and connects the closure panel assembly 118 for movement relative to the body 14. The hinge assembly 120 includes a first hinge 122 and a second hinge 124 arranged in parallel with one another to establish a four-bar linkage together with the body 14 and the closure panel assembly 118 to which they are secured. The hinge assembly 120 may be referred to as a four-bar linkage hinge assembly 120. For clarity and in order to differentiate from the first hinge 22 and the second hinge 24, the first hinge 122 may be referred to as a third hinge, and the second hinge 124 may be referred to as a fourth hinge. The third hinge 122 is a mirror image of the first hinge 22 and functions as described with respect to the first hinge 22. The fourth hinge 124 is a mirror image of the second hinge 24 and functions as described with respect to the second hinge 24. The second closure panel assembly 118 is configured to be movable between a closed position (FIGS. 4 and 9) and a fully open position (FIGS. 8 and 13) via pivoting of the third hinge 122 and the fourth hinge 124. The second closure panel assembly 118 at least partially covers a different portion of the opening 12 than the first closure panel assembly 18 when the second closure panel assembly 118 is in the closed position, and at least partially uncovers the opening 12 in the open position. The second closure panel assembly 118 is disposed generally parallel with the opening 12 and with the first closure panel assembly 18 in both the closed position and the open position.

A drive motor 60 is connected to the hinge assembly 20 and configured for pivoting the hinge assembly 20 over the range of motion shown in FIGS. 4-13. A similar drive motor 60 is connected to the hinge assembly 120 and is configured for pivoting the hinge assembly 120 over the range of motion shown in FIGS. 4-13. As shown, the drive motors 60 rotationally drive the hinges 24, 124. For example, the drive motor 60 has a rotor that rotates concentrically about the axis A2 in FIG. 1 to cause the second hinge 24 to pivot about the axis A2. The drive motors 60 may be controlled by a controller (not shown) according to a stored algorithm that opens and closes the closure assembly 10 in response to predetermined inputs that may be received from various sensors or other components located on or off of the vehicle 16. The first hinge 22 is caused to pivot about the axis A1 by the drive motor 60 via its connection to the second hinge 24 by the four-bar linkage arrangement.

As shown in FIG. 3, additional upper hinge assemblies 62, 162 are connected to the body 14 and the respective closure panel assemblies 18, 118 near the top of the opening 12 and the closure panel assemblies 18, 118. The upper hinge assemblies 62, 162 are also each configured as a four-bar linkage. The upper hinge assemblies 62, 162 are not driven by a motor, and are caused to pivot to help support and guide the closure panel assemblies 18, 118 when the drive motors 60 power the hinge assemblies 20, 120. The closure panel assemblies 18, 118 may also be configured to open manually in addition to or as an alternative to being opened automatically by drive motors 60, such as by pulling on handles at the interior or exterior of the closure panel assembles 18, 118. Additional latch portions 43 may be mounted to the body 14 near the top of the opening 12 to latch upper portions of the closure panel assemblies 18, 118 to the body 14 when the closure panel assemblies 18, 118 are in the closed position.

A second segmented hinge cover 134 (shown in FIGS. 4-13, not shown in FIG. 3) is fixed to the third hinge 122 via brackets 40 or otherwise in a similar manner as hinge cover 34 is fixed to the first hinge 22. The second hinge cover 134 is pivotably connected to the second closure panel assembly 118 as shown and described with respect to FIGS. 4-13. The second hinge cover 134 is configured to articulate alongside the third hinge 122 throughout a range of motion of the second closure panel assembly 118 from the closed position to the fully open position and to at least partially cover the third hinge 122 in the closed position. As is apparent in FIGS. 9-13, the segmented hinge cover 134 is configured to be relatively extended when the closure panel assembly 118 is in the closed position, and to be relatively folded when the closure panel assembly 118 is in the open position. As best shown in FIG. 4, the hinge cover 134 is configured to be disposed along a lower edge 136 of the inner panel 118B at the recess 133, with the first hinge 122 and the second hinge 124 disposed between (e.g., inward of) the hinge cover 134 and the inner panel 118B when the closure panel assembly 118 is in the closed position.

As shown in FIGS. 4 and 9, like the first hinge cover 34, the second hinge cover 134 includes three segments. More specifically, the second hinge cover 134 has a proximal segment 134A (also referred to herein as a first section), an intermediate segment 134B (also referred to herein as a second section), and a distal segment 134C (also referred to herein as a third section). Unlike distal segment 34C, the distal segment 134C is planar instead of L-shaped, as best shown in FIG. 9. The proximal segment 134A is configured to be fixed to the third hinge 122 at an intermediate position between the first body-side pivot axis B1 and the first closure panel-side axis B3. One or more fixed (nonpivoting) brackets 40 may be welded or otherwise secured to the back (hinge-facing side) of the hinge cover 134 and bolted or otherwise secured to the first hinge 122.

Like the closure panel assembly 18, a first portion 42 of a latch assembly 44 and is mounted to the closure panel assembly 118. The latch assembly 44 also includes a second latch portion 43 mounted on the body 14 at a lower extent of the opening 12 as shown in FIG. 3. For example, one of the portions 42, 43 may include a striker, and the other portion may include a latch.

Referring to FIG. 9, the hinge assembly 120 includes four pivot axes B1, B2, B3, and B4 positioned relative to one another in the same manner as the pivot axes A1-A4 of the hinge assembly 20. More specifically, the third hinge 122 is configured to be pivotably connected to the body 14 at a first body-side pivot axis B1 that extends through a knuckle at the proximal end of the third hinge, similar to knuckle 22A, and through bracket 26. The second hinge 124 is configured to be pivotably connected to the body 14 at a second body-side pivot axis B2 that extends through a knuckle at the proximal end of the second hinge 124, similar to knuckle 24A, and through bracket 26. Pins extend through openings in the brackets 26 aligned with the knuckles to secure the hinges 122, 124 to the body 14 at the brackets 26. Distal ends of the hinges 122, 124 include knuckles at which the hinges 122, 124 are secured to the closure panel assembly 118 via one or more brackets 28 for pivoting motion relative to the closure panel assembly 118. The first hinge 122 is thus pivotably connected to the closure panel assembly 118 at a first closure panel-side axis B3 extending through the knuckle into the joint of the bracket 28. The second hinge 124 is pivotably connected to the closure panel assembly 118 at a second closure panel-side axis B4 extending through the knuckle into another joint of the bracket 28. Pins (not shown) extend through openings in the knuckles aligned with openings in the bracket 28 to secure the hinges 122, 124 to the closure panel assembly 118 at the bracket 28.

Still referring to FIG. 9, a pivot pin 148 extends through a knuckle at the end of the distal segment 134C and into the inner panel 118B to pivotably secure the distal segment 134C to the closure panel assembly 118 at the first hinge cover pivot axis B5. Interfitting knuckles of the intermediate segment 134B and the proximal segment 134A receive a pivot pin 150 to pivotably secured the intermediate segment 134B to the proximal segment 134A at a second hinge cover pivot axis B6. Similarly, interfitting knuckles of the intermediate segment 134B and the distal segment 134C receive a pivot pin 152 to pivotably secure the intermediate segment 134B to the distal segment 134C at a third hinge cover pivot axis B7. The pivot pin 152 does not extend into the closure panel assembly 118 so that it is connected with segments 134B and 134C but not with the closure panel assembly 118.

The hinge cover 134 has one degree of freedom relative to the third hinge 122 at the second hinge cover pivot axis B6 as the intermediate segment 134B pivots relative to the third hinge 122 at the axis B6, but the proximal segment 134A is fixed to the third hinge 122 so that the axis B6 cannot translate relative to the third hinge 122. The hinge cover 134 has two degrees of freedom relative to both the third hinge 122 and the closure panel assembly 118 at the third hinge cover pivot axis B7. As further discussed with respect to FIGS. 9-13, the hinge cover 134 can both translate and pivot at the third hinge cover pivot axis B7 relative to the third hinge 122 and relative to the closure panel assembly 118. This arrangement of the hinge cover 134 enables the hinge cover 134 to articulate as the hinge assembly 120 moves through its full range of motion without inhibiting the hinge assembly 120.

FIGS. 4 and 9 show the closure panel assemblies 18, 118 in a fully closed position. It is apparent in FIG. 4 that the hinge concealment mechanisms 34, 134 partially cover the hinge assemblies 20, 120 from a point of view looking outboard from the passenger compartment 17 of FIG. 1 when the closure panel assemblies 18, 118 are in the fully closed positions. The plan view of FIG. 9 shows that each of the hinges 22, 24, 122, 124 has a non-linear, zig-zag shape between its respective ends which allows the hinges 22, 24 and the hinges 122, 124 to be packaged with the axes A1 and A2 falling in a common plane and with the axes A3 and A4 falling in another common plane that is parallel with the common plane in which the axes A1 and A2 fall. The hinges 22 and 24 are stacked adjacent to one another in the laterally-outboard direction between the axes A1 and A4. In the closed position of the closure panel assemblies 18, 118, the hinges 122 and 124 are stacked adjacent one another in the laterally-outboard direction between the axes B1 and B4. This minimizes the overall width of the hinge assemblies 20, 120 in the lateral direction when in the closed position.

Figure 5:
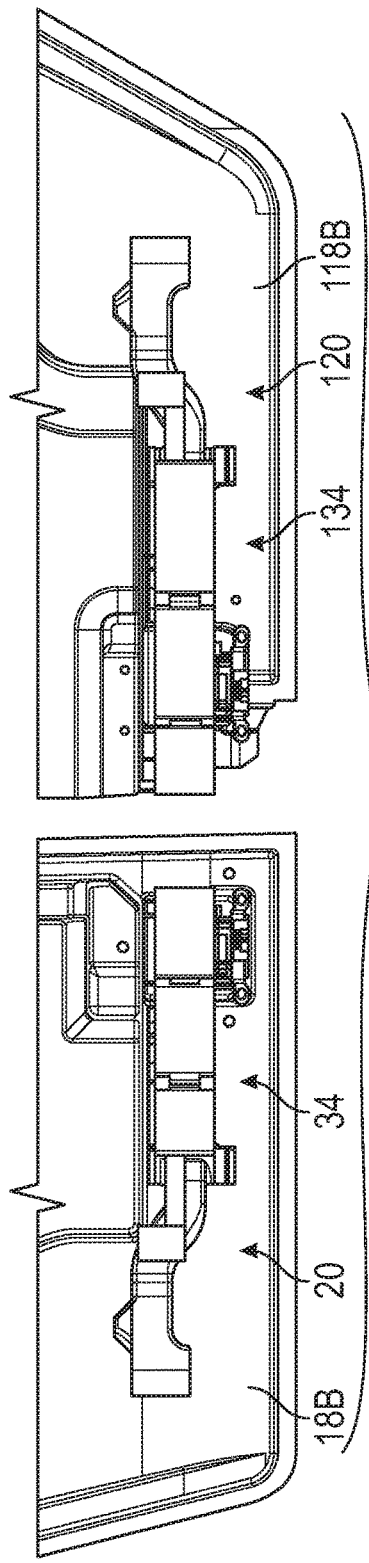
FIG. 5 is a fragmentary view of the inner side of the closure panel assemblies, lower hinge assemblies, and hinge concealment mechanisms of FIG. 4 with the closure panel assemblies in a partially open position.
Figure 10:
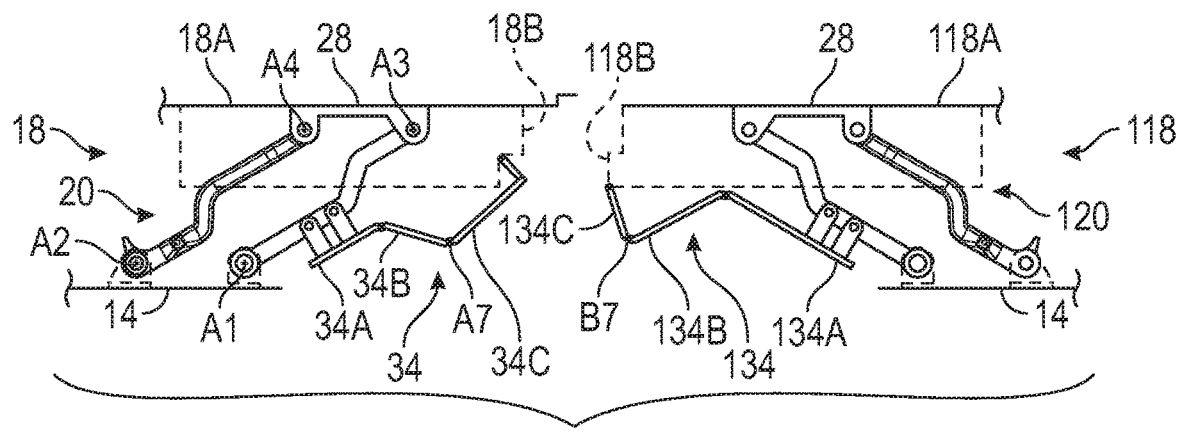
FIG. 10 is a top view of the closure panel assemblies, lower hinge assemblies, and hinge concealment mechanisms with the closure panel assemblies in the partially open position of FIG. 5.

FIGS. 5 and 10 show the closure panel assemblies 18, 118 in a partially open position, with a space between the closure panel assemblies 18, 118 revealed as the hinge assemblies 20, 120 are pivoted approximately 30 degrees about the axes A1, A2, B1 and B2 from their starting positions of FIGS. 4 and 9. The brackets 26 are not shown in phantom in FIGS. 5-8. As the closure panel assemblies 18, 118A move from the fully closed position of FIG. 9 to the partially open position of FIG. 10, the hinge concealment mechanisms 34, 134 articulate from the relatively flat position of FIG. 9 to the slightly folded position of FIG. 10. The proximal segments 34A, 134A pivot with the hinges 22, 122 and the distal segments 34C, 134C pivot and translate with the closure assemblies 18, 118, moving apart from one another. This causes the hinge concealment mechanisms 34, 134 to partially fold due to the two degrees of freedom provided at the pivot axes A7, B7.

Figure 6:
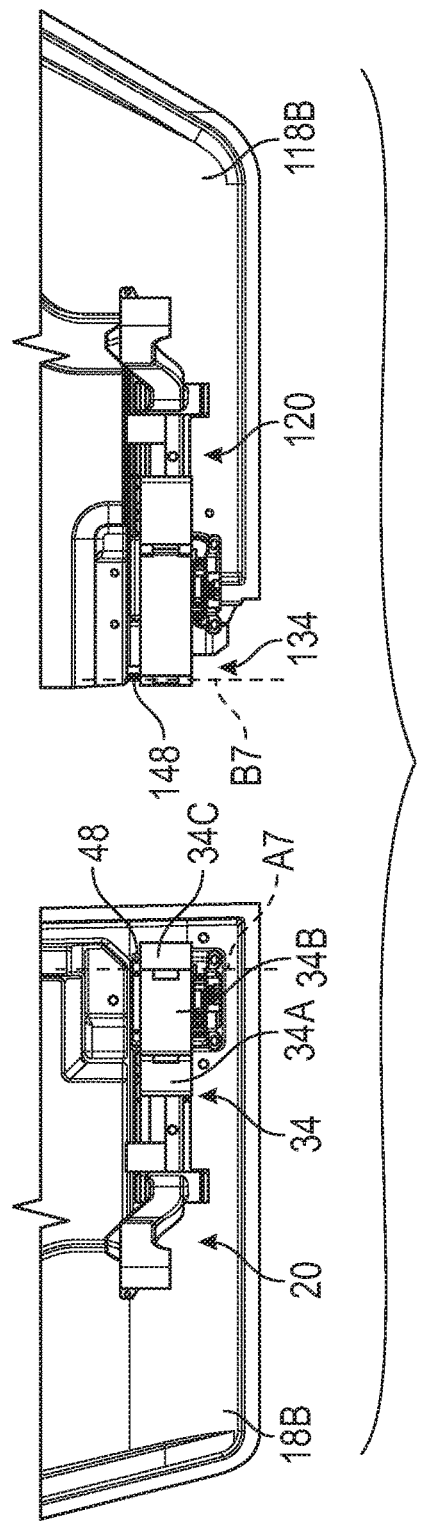
FIG. 6 is a fragmentary view of the inner side of the closure panel assemblies, lower hinge assemblies, and hinge concealment mechanisms with the closure panel assemblies in another partially open position that is further open than in FIG. 5.
Figure 11:
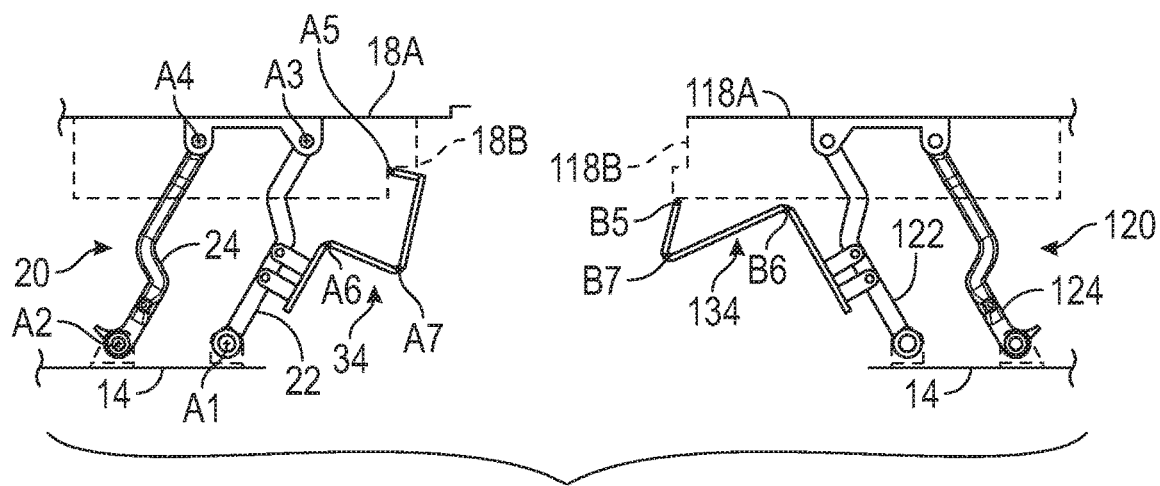
FIG. 11 is a top view of the closure panel assemblies, lower hinge assemblies, and hinge concealment mechanisms with the closure panel assemblies in the partially open position of FIG. 6.

FIGS. 6 and 11 show the closure panel assemblies 18, 118 in another partially open position, further open than in FIGS. 5 and 10, with the hinge assemblies 20, 120 pivoted approximately 60 degrees about the axes A1, A2, B1 and B2 from their starting positions of FIGS. 4 and 9. The hinge concealment mechanisms 34, 134 are further folded due to the two degrees of freedom provided at the pivot axes A7, B7.

Figure 7:
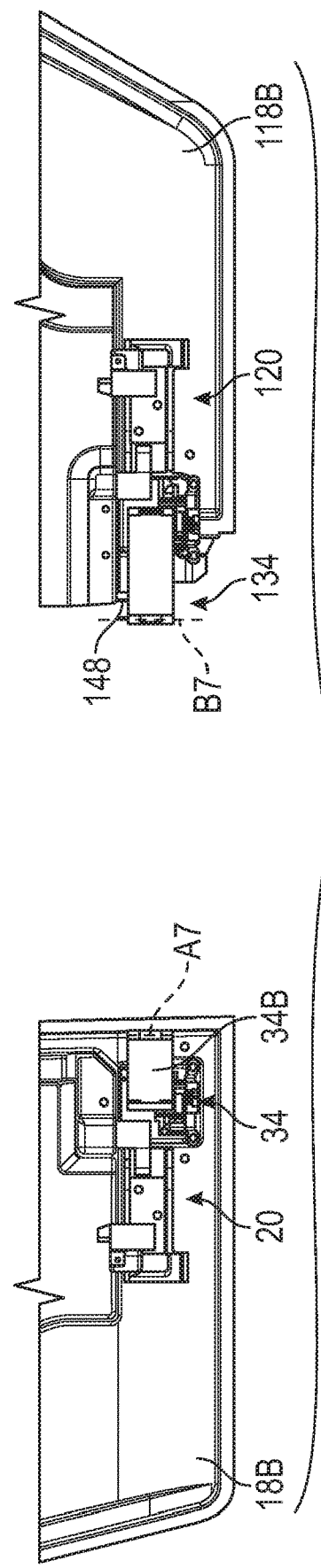
FIG. 7 is a fragmentary view of the inner side of the closure panel assemblies, lower hinge assemblies, and hinge concealment mechanisms with the closure panel assemblies in a still further partially open position that is further open than in FIG. 6.
Figure 12:
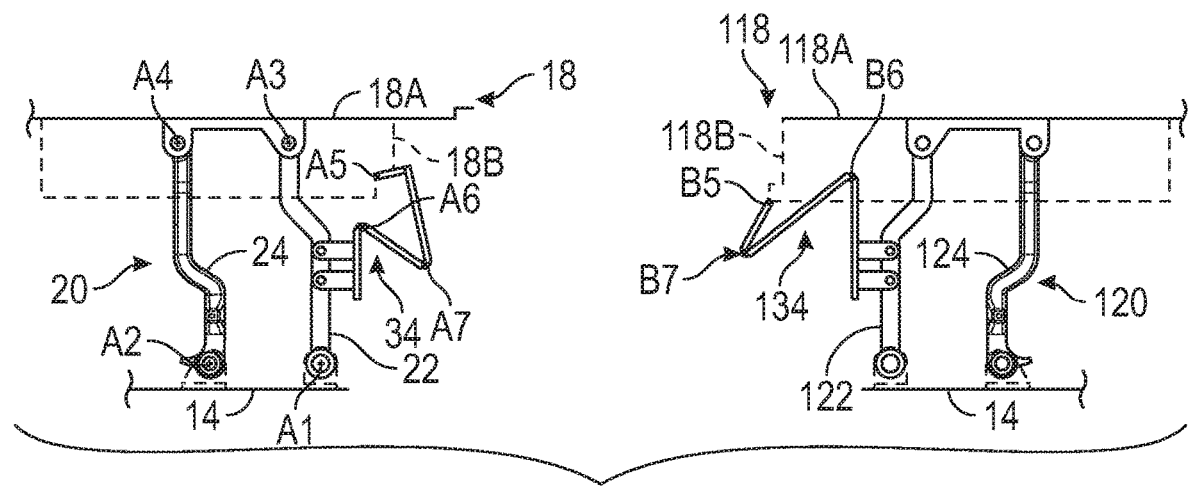
FIG. 12 is a top view of the closure panel assemblies, lower hinge assemblies, and hinge concealment mechanisms with the closure panel assemblies in the partially open position of FIG. 7.

FIGS. 7 and 12 show the closure panel assemblies 18, 118 in another partially open position, further open than in FIGS. 6 and 11, with the hinge assemblies 20, 120 pivoted approximately 90 degrees about the axes A1, A2, B1 and B2 from their starting positions of FIGS. 4 and 9. The hinge concealment mechanisms 34, 134 are further folded due to the two degrees of freedom provided at the pivot axes A7, B7.

Figure 8:
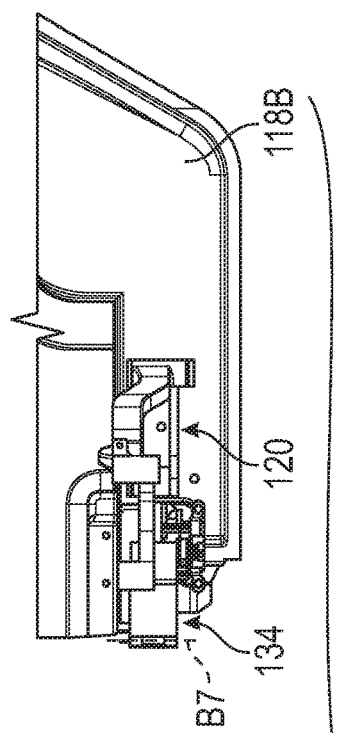
FIG. 8 is a fragmentary view of the inner side of the closure panel assemblies, lower hinge assemblies, and hinge concealment mechanisms with the closure panel assemblies in a fully open position.
Figure 8:
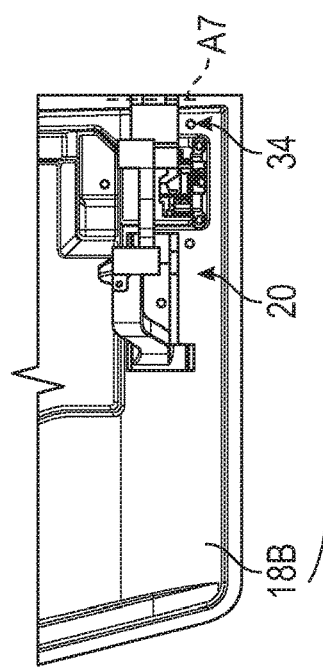
Figure 13:
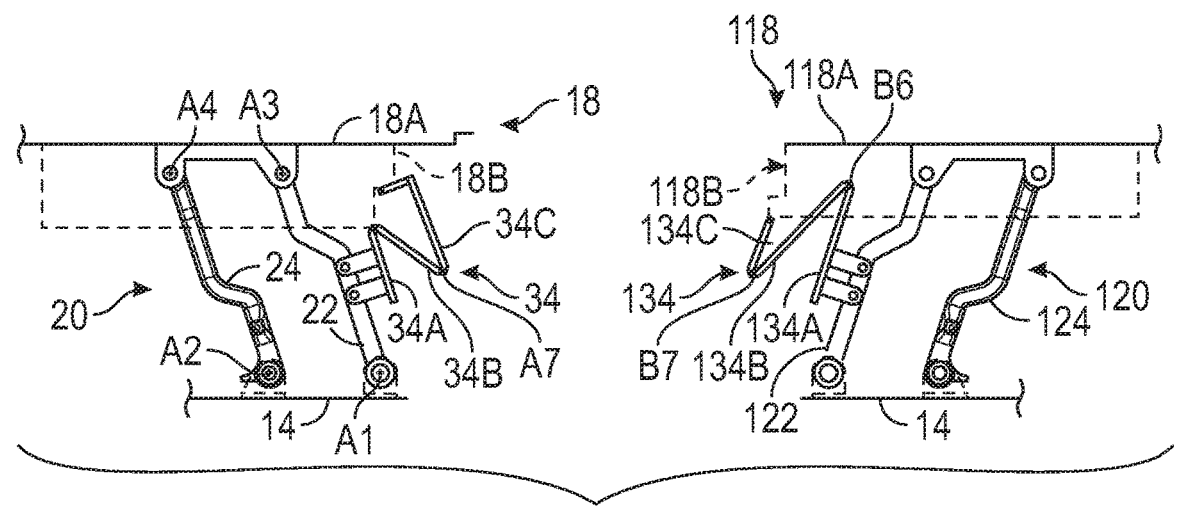
FIG. 13 is a top view of the closure panel assemblies, lower hinge assemblies, and hinge concealment mechanisms with the closure panel assemblies in the open position of FIG. 8.

FIGS. 8 and 13 show the closure panel assemblies 18, 118 in a fully open position, further open than in FIGS. 7 and 12, with the hinge assemblies 20, 120 pivoted approximately 105 degrees about the axes A1, A2, B1 and B2 from their starting positions of FIGS. 4 and 9. The hinge concealment mechanisms 34, 134 are further folded due to the two degrees of freedom provided at the pivot axes A7, B7.

In each of FIGS. 4-13, it is apparent that the hinge concealment mechanisms 34, 134 are between the hinge assemblies 20, 120 and the area of ingress into and egress from the opening 12 of the body (shown in FIG. 2) that opens between the opening closure panel assemblies 18, 118. Accordingly, the hinge concealment mechanisms 34, 134 are between an occupant and the hinge assemblies 20, 120 as an occupant enters into or egresses from the passenger compartment 17 and at least partially cover the hinge assemblies 20, 120 to hide them from view.

Figure 14:
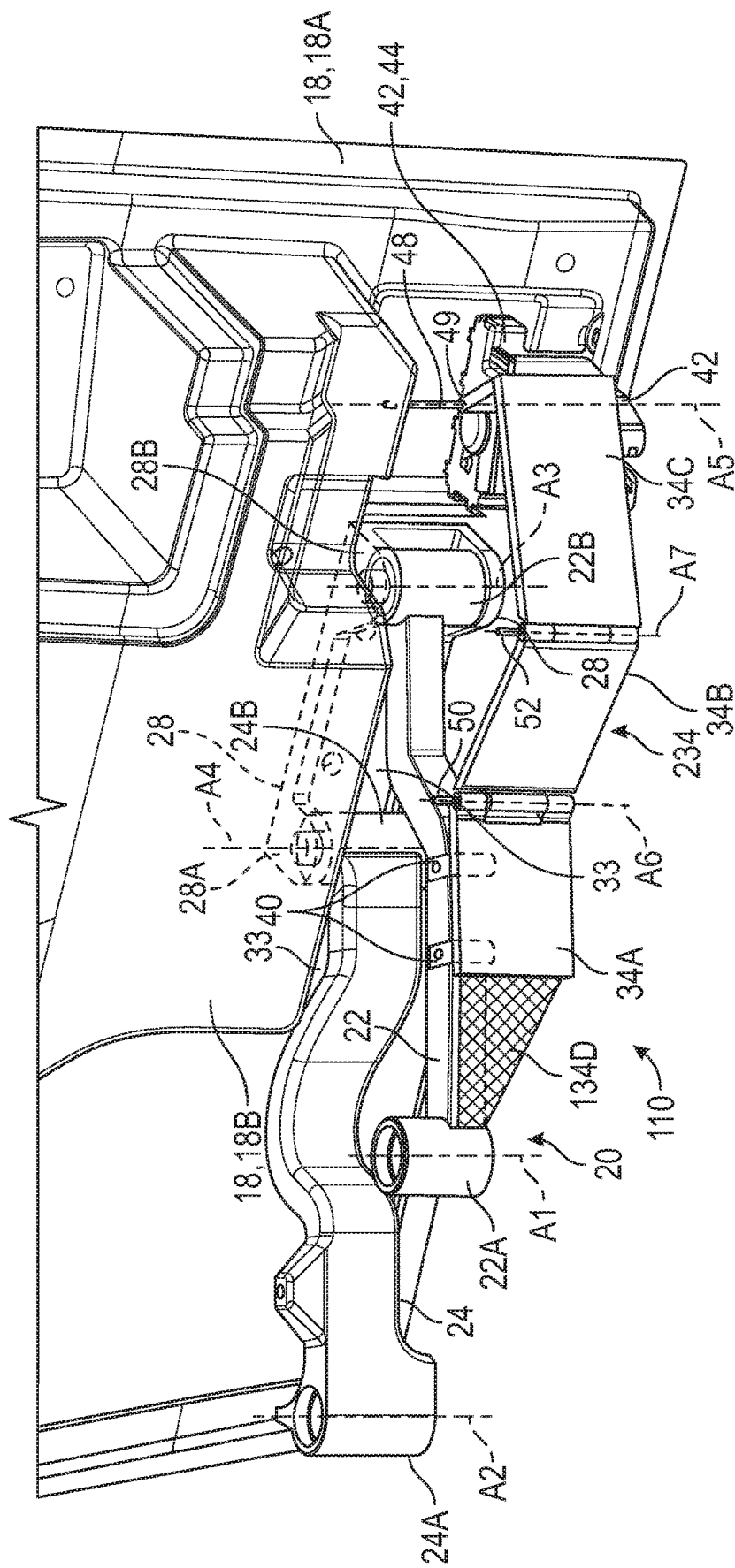
FIG. 14 is a fragmentary perspective view of a portion of a closure system with the closure panel assembly, lower hinge assembly, and an alternative hinge concealment mechanism.

FIG. 14 is a fragmentary perspective view of a portion of a closure system 110 with the closure panel assembly 18, hinge assembly 20, and an alternative hinge concealment mechanism 234. The hinge concealment mechanism 234 includes the segments 34A, 34B, and 34C configured as described with respect to the hinge concealment mechanism 34. The hinge concealment mechanism 234 also includes a hinge cover that is a flexible covering 134D such as a stretchable fabric configured to be secured to the first hinge 22 between the first body-side pivot axis A1 and the proximal segment 34A and secured to the proximal segment 34A. The flexible covering 134D thus covers the first hinge 22 between the first body-side pivot axis A1 and the proximal segment 34A. A similar hinge concealment mechanism may be disposed on the hinge 122 between the first body-side pivot axis B1 and the proximal segment 134A.

While the best modes for carrying out the disclosure have been described in detail, those familiar with the art to which this disclosure relates will recognize various alternative designs and embodiments for practicing the disclosure within the scope of the appended claims.

What is claimed is:
1. A closure system for at least partially closing an opening defined by a body, the closure system comprising:
  a closure panel assembly;
  a hinge assembly configured to connect the closure panel assembly to the body, the hinge assembly including:
    a first hinge configured to be pivotably secured to the body and to the closure panel assembly, and
    a second hinge configured to be pivotably secured to the body and to the closure panel assembly and extending generally parallel to the first hinge, the hinge assembly establishing a four-bar linkage;
  a hinge cover configured to be fixed to the first hinge and pivotably connected to the closure panel assembly;
  wherein the closure panel assembly is movable between a closed position and an open position via pivoting of the first hinge and the second hinge relative to the closure panel assembly and the body, the closure panel assembly at least partially covering the opening in the closed position and at least partially uncovering the opening in the open position;
  wherein the hinge cover is configured to articulate relative to the first hinge throughout a range of motion of the closure panel assembly from the closed position to the open position and at least partially covers the first hinge in the closed position;

wherein the hinge cover includes a proximal segment configured to be fixed to the first hinge such that the proximal segment is nonpivotable relative to the first hinge, a distal segment configured to be directly pivotably secured to the closure panel assembly at a first hinge cover pivot axis, and an intermediate segment configured to be pivotably secured to the proximal segment at a second hinge cover pivot axis and pivotably secured to the distal segment at a third hinge cover pivot axis;

wherein the distal and intermediate segments of the hinge cover have two degrees of freedom relative to both the first hinge and the closure panel assembly at the third hinge cover pivot axis;

wherein the first hinge is configured to be pivotably connected to the body at a body-side pivot axis and to be pivotably connected to the closure panel assembly at a closure panel-side pivot axis;

wherein the proximal segment is configured to be fixed to the first hinge at an intermediate position along a length of the first hinge between the body-side pivot axis and the closure panel-side pivot axis; and wherein the hinge cover includes a flexible covering configured to be secured to the first hinge between the body-side pivot axis and the proximal segment and secured to the proximal segment and covering the first hinge between the body-side pivot axis and the proximal segment.

2. The closure system of claim 1, wherein the hinge cover is at least partially folded when the closure panel assembly is in the open position.

3. The closure system of claim 1, wherein:

the body-side pivot axis is a first body-side pivot axis and the closure panel-side pivot axis is a first closure panel-side pivot axis;

the second hinge is configured to be pivotably connected to the body at a second body-side pivot axis and pivotably connected to the closure panel assembly at a second closure panel-side pivot axis; and the first body-side pivot axis is disposed between a midline of the opening and the second body-side pivot axis, the first closure panel-side pivot axis is disposed between the midline of the opening and the second closure panel-side pivot axis, and the first hinge cover pivot axis is disposed between the midline of the opening and the first closure panel-side pivot axis.

4. The closure system of claim 1, wherein:

the closure panel assembly includes an outer panel and an inner panel configured to be secured to an inner side of the outer panel above the hinge assembly; and the hinge cover is disposed along a lower edge of the inner panel when the closure panel assembly is in the closed position, with the first hinge and the second hinge extending between the hinge cover and the outer panel.

5. The closure system of claim 4, wherein the body is a vehicle body having a floor, and the hinge assembly is configured to be disposed above the floor.

6. The closure system of claim 1, wherein the hinge assembly is a first hinge assembly, the closure panel assembly is a first closure panel assembly, the hinge cover is a first hinge cover, and the closure system further comprising:

a second closure panel assembly;

a second hinge assembly configured to connect the second closure panel assembly to the body, the second hinge assembly including:
   a third hinge configured to be pivotably secured to the body and to the second closure panel assembly, and
   a fourth hinge configured to be pivotably secured to the body and to the second closure panel assembly and extending generally parallel to the third hinge, the second hinge assembly establishing a four-bar linkage;

a second hinge cover configured to be fixed to the third hinge and pivotably connected to the second closure panel assembly;

wherein the second closure panel assembly is configured to be movable between a closed position and an open position via pivoting of the third hinge and the fourth hinge relative to the second closure panel assembly and the body, the second closure panel assembly at least partially covering a different portion of the opening than the first closure panel assembly when the first closure panel assembly is in the closed position and the second closure panel assembly is in the closed position, and the second closure panel assembly at least partially uncovering the opening in the open position; and wherein the second hinge cover is configured to articulate relative to the third hinge throughout a range of motion of the second closure panel assembly from the closed position to the open position and to at least partially cover the third hinge in the closed position.

7. The closure system of claim 1, further comprising:

a drive motor configured to be connectable to the hinge assembly and configured for pivoting the hinge assembly.

* * * * *